US010498859B2

(12) United States Patent
Pirat et al.

(10) Patent No.: US 10,498,859 B2
(45) Date of Patent: Dec. 3, 2019

(54) SYSTEM AND METHOD FOR SELF-DEPLOYING AND SELF-ADAPTING CONTACT CENTER COMPONENTS

(71) Applicant: GENESYS TELECOMMUNICATIONS LABORATORIES, INC., Daly City, CA (US)

(72) Inventors: Vincent Pirat, Brest (FR); Clément Choel, Guipronvel (FR); Christian Jacolot, Landerneau (FR)

(*) Notice: Subject to any disclaimer, the term of this patent is extended or adjusted under 35 U.S.C. 154(b) by 292 days.

(21) Appl. No.: 15/481,396

(22) Filed: Apr. 6, 2017

(65) Prior Publication Data

US 2018/0295211 A1   Oct. 11, 2018

(51) Int. Cl.
*G06F 9/46* (2006.01)
*H04L 29/08* (2006.01)
*H04L 29/12* (2006.01)

(52) U.S. Cl.
CPC ........ *H04L 67/34* (2013.01); *H04L 61/2007* (2013.01); *H04L 61/2092* (2013.01); *H04L 61/3005* (2013.01); *H04L 61/35* (2013.01)

(58) Field of Classification Search
USPC ....................................................... 718/106
See application file for complete search history.

(56) References Cited

U.S. PATENT DOCUMENTS

| 7,016,972 B2* | 3/2006 | Bertram ............. G06F 11/3495 |
| | | 709/224 |
| 9,723,058 B2* | 8/2017 | Xu ......................... H04L 67/10 |
| 2006/0036993 A1 | 2/2006 | Buehler et al. |
| 2008/0219429 A1 | 9/2008 | Mandalia et al. |
| 2013/0086576 A1 | 4/2013 | Li et al. |
| 2014/0072115 A1 | 3/2014 | Makagon et al. |
| 2014/0079207 A1 | 3/2014 | Zhakov et al. |
| 2014/0359098 A1 | 12/2014 | Xu |

OTHER PUBLICATIONS

International Search Report and Written Opinion for Application No. PCT/US2018/026275, dated Jul. 6, 2018, 14 pages.

* cited by examiner

*Primary Examiner* — Alicia Baturay

(57) ABSTRACT

A system and method for self-deploying applications for a contact center. An executable unit is built for deploying an application for the contact center, and the application and logic for provisioning the application are aggregated into the executable unit. The executable unit is then provided for deployment. When the executable unit is run, logic within the executable unit is configured to automatically register the application on the computing environment, discover and resolve services used by the application, and start the application on the computing environment.

18 Claims, 11 Drawing Sheets

SYSTEM AND METHOD FOR SELF-DEPLOYING AND SELF-ADAPTING CONTACT CENTER COMPONENTS

BACKGROUND

It is desirable to aid companies in deploying their contact center operations as efficiently and successfully as possible. However, deployment of contact center applications often call for complex provisioning that generally requires network, product, and solution level knowledge for executing the deployment. Although the process may be automated in some fashion via a script that hard-codes the requirements of the deployment, such hard-coding often confines the deployment to the particular contact center or environment for which it is intended. The deployment may not be portable, without changes, to another environment that has its own set of specifics different from the first environment.

Existing mechanisms for provisioning applications also often rely on external infrastructure like a Domain Name System (DNS) for services like directory services that are needed for deploying an application on a network. The reliance on external infrastructure introduces a single point of failure which is undesirable for a robust, distributed system.

Accordingly, what is needed is a system and method for provisioning applications for a contact center that is self-deployable and adaptable to the environment in which it is deployed.

SUMMARY

Embodiments of the invention are directed to a system for self-deploying applications for a contact center. The system includes a processor and a memory, where the memory stores instructions that, when executed by the processor, cause the processor to: receive instructions to build an executable unit for deploying an application for the contact center; in response to the instructions, aggregate into the executable unit, the application and logic for provisioning the application; and provide the executable unit for self-deploying the application on a computing environment associated with the contact center, wherein the logic is configured to perform actions for self-deploying the application in response to the executable unit being run.

According to one embodiment of the invention, the actions include automatically registering the application on the computing environment. The automatically registering the application may include assigning a network name and a network address to the application without access to an external directory service. The automatically registering the application may also include resolving naming and address conflicts without access to the external directory service.

According to one embodiment of the invention, the logic for automatically registering the application on the computing environment includes configuration logic for assigning a network name and a network address to the application without access to an external directory service. The configuration logic may include logic for resolving naming and address conflicts without access to the external directory service.

According to one embodiment of the invention, the actions include monitoring a state of the application and publishing the state to other applications on the computing environment.

According to one embodiment of the invention, the executable unit includes data on external services depended upon by the application, and the actions include resolving the external services.

According to one embodiment, the resolving of the external services includes locating the external services on, the computing environment According to one embodiment of the invention, the resolving of the external services includes comparing data of a responding external service against service conditions, and determining a match of the data against the service conditions.

According to one embodiment of the invention, the resolving of external services includes blocking provisioning of the application in response to the external services not being resolved.

According to one embodiment of the invention, the instructions that cause the processor to aggregate the application and the logic include instructions that cause the processor to generate a container for the application and the logic via container technology.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

In general terms, embodiments of the present invention are directed to an out-of-the box solution for provisioning applications for a contact center. The applications may provide new functionality to the contact center (e.g. chat service), or enhance existing functionality by adapting resources to the needs of the business (e.g. adding more SIP servers). Although the term application generally refers to a software application, a person of skill in the art should recognize that the term application may encompass any computer resource or component known in the art. Thus, the terms application and component are used interchangeably herein, to refer to any type of computer resource.

According to one embodiment, the applications may be provisioned anywhere—on a local computing environment, remote computing environment, or both. According to one embodiment, the applications are self-deployable. In this regard, logic for the deployment and the application that is to be deployed, are packaged together into a core image, and provided to a user for deployment. The user simply executes the core image, and the deployment logic installs, registers, and provisions the application on the network. There is no reliance on an external infrastructure to register the application on the network, providing for a robust, de-centralized architecture.

In addition, according to one embodiment, the user needs no prior knowledge of the network or environment, and there is no need for manual configuration, in order to deploy the application. In this regard, the provisioning logic allows the automatic discovery and synchronization of services that are needed for the deployment. The automatic discovery and synchronization further allows the application to be communication stack agnostic or portable from one environment to another, without making changes to cater the deployment to the specifics of the environment or communication stack in which it is deployed. Once the deployment package is built for a particular component, it need not be modified for other environments for the same type of component.

Figure 1:
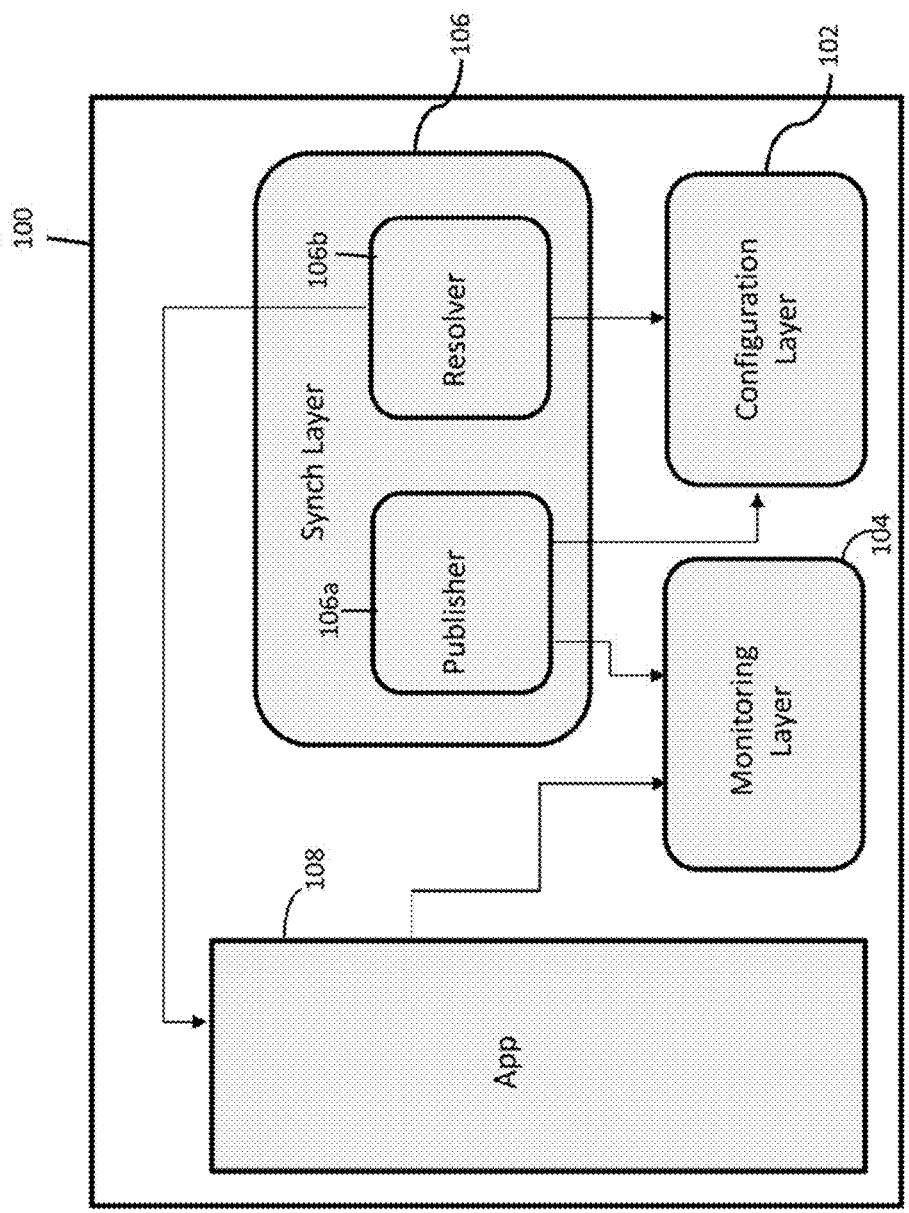
FIG. 1 is a logical block diagram of a self-deployable runnable image according to one embodiment of the invention.

FIG. 1 is a logical block diagram of a self-deployable runnable image (or executable unit) 100 according to one embodiment of the invention. For purposes of simplicity, the runnable image is referred to as a container, although the invention is not limited to container technology. The container may be a software container implemented using the Docker container technology, or any operating system level virtualization or isolation that is conventional in the art. As mentioned, a person of skill in the art should appreciate that the invention is not limited to containers, but may extend to other types of software containers or packages such as, for example, AMI image, zip files, MSI file, and the like.

According to one embodiment, the container 100 is a runnable/executable unit that packages the deployment logic and data along with the component 108 that is to be deployed. The deployment logic is tailored to the type of component that is to be deployed. For example, the deployment logic for deploying an email application/server may differ from the deployment logic for deploying a SIP application/server.

According to one embodiment, the deployment logic is composed of various layers including a configuration layer 102, monitoring layer 104, and synchronization layer 106. Although not shown, the deployment logic also includes scripts, files, configuration data, and other types of logic used for self-deployment.

The various layers 102-106 of the deployment logic may be aggregated and packaged together to build a core image that defines the basic of the runnable unit. According to one embodiment, the various layers 102-106 are themselves containers. The aggregation of the various containers may be achieved through inheritance, by "injecting" an image to another one, or the like.

According to one embodiment, the configuration layer 102 is implemented as a network and service discovery daemon that is based on existing zeroConfiguration protocols such as, for example, Apple Bonjour, Linux Avahi, and the like. Although zeroConfiguration is used as an example, a person of skill in the art should appreciate that embodiments of the invention extend to other protocols that allows auto-configuration of a component (e.g. without relying on manual configuration or external configuration servers), whether it is referred to as a zeroConfiguration protocol or not.

The configuration layer 102 enables the container 100 to start and auto-configure itself on the environment in which it is installed. In this regard, the configuration layer automatically assigns itself a network address and name (hostname) without connecting to an external directory service or other external configuration servers, and without manual configuration, and registers itself on the network with the assigned name and address. During the assignment of the name and address, the configuration layer is adapted to internally resolve any conflicts that may arise in the name or address that is selected, in an automated manner.

The synchronization layer 106 includes a publisher 106a and resolver 106b sub-logics, which are both clients of the configuration layer 102. According to one embodiment, the synchronization layer is implemented using the Java programming language, although the invention is not limited to Java, and may extend to other programming languages such as Python, C, C++, and the like. The resolver 106b identifies various dependencies (e.g. other applications, services, and resources) that need to the linked to or created, based on custom rules that vary depending on the type of component to deploy. The custom rules may include, for example, a list of services and associated conditions that are required for the component 108 to start. According to one embodiment, the resolver 106b blocks the component 108 from starting until all conditions are met. For example, the resolver 106b may work with the configuration layer 102 to auto-configure/provision the component 108. In this regard, the resolver locates a configuration server on the network, and when one is found, registers the container by creating a host entry in a host folder of the configuration server. The resolver 106b also creates an application in an application folder of the configuration server.

The monitoring layer 104 works with the publisher 106a to trigger publication of the service to the rendered by the component 108. Publisher 106a connects to the monitoring layer 104 and publishes/unpublishes the service availability and its properties (if any). For example, when the start conditions are met, and the component is ready to start, the monitoring layer 104 starts the application and publishes the status of the process to the publisher 106a to publish externally via the configuration module 102. The various statuses that may be reported for an application include a "start" status, "running" status, "stopping" status, and the like.

As a person of skill in the art should appreciate, the deployment architecture that is described in embodiments of the present invention allow for a self-deployable component and is decentralized as well as synchronized and adaptable to the environment in which it is deployed.

Figure 2:
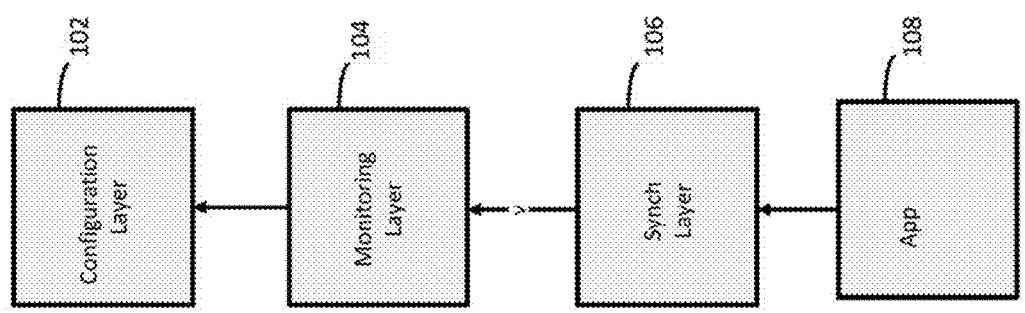
FIG. 2 is a logical block diagram of the various subsystems encapsulated into the container via inheritance according to one embodiment of the invention.

FIG. 2 is a logical block diagram of the various subsystems 102-106 encapsulated into the container 100 via inheritance according to one embodiment of the invention.

Initially, a first container image with the configuration layer 102 is built or retrieved. A second container image is then built with the configuration layer 102 and monitoring layer 104, by inheriting from the first image. A third container image is then built with the configuration layer 102, monitoring layer 104, and synchronization layer 106, by inheriting from the second image. The third container image is finally built with the configuration layer 102, monitoring layer 104, synchronization layer 106, and the component 108 to be deployed, by inheriting from the third image.

Figure 3:
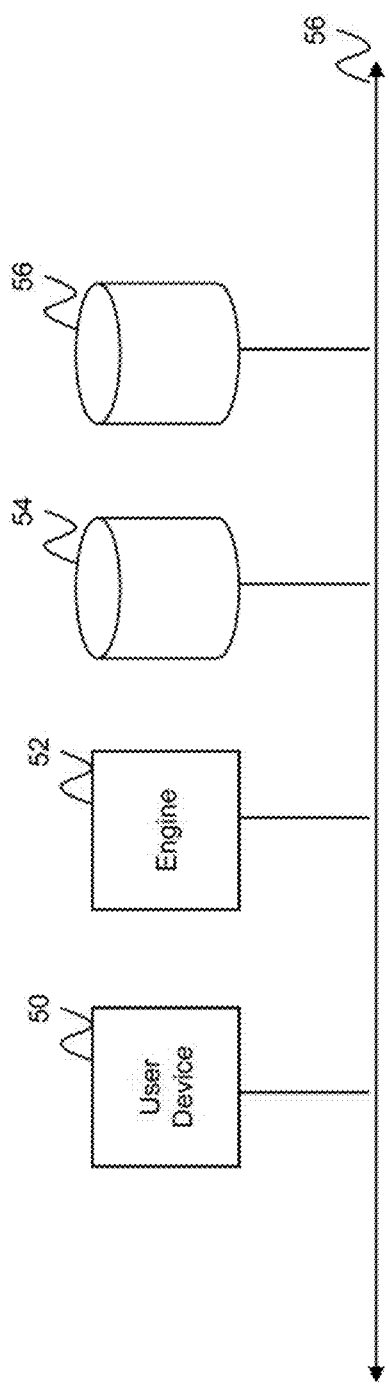
FIG. 3 is a block diagram of a system for building a self-deploying, self-adapting component according to one embodiment of the invention.

FIG. 3 is a block diagram of a system for building a self-deploying, self-adapting component according to one embodiment of the invention. The system includes an end user device 50, build engine 52, registry 54, and repository 56, coupled to one another over a data communications network 58. The data communications network 58 may be a local area network, wide area network, or a combination of both. The build engine 52 is configured to build an image of a self-deployable component in response to a command from a user transmitted via the end user device 50. According to one embodiment, containers are built based on other containers that are already built and stored in the registry 54. In this regard, the registry is a database system with logic and hardware to store and retrieve containers in response to a command from the build engine 52. The repository 56 is also a database system with logic and hardware to store and retrieve components that are to be deployed. Although the registry and repository are depicted as separate database systems, a person of skill in the art should recognize that they may be combined into a single database system without departing from the spirit of the invention.

Figure 4:
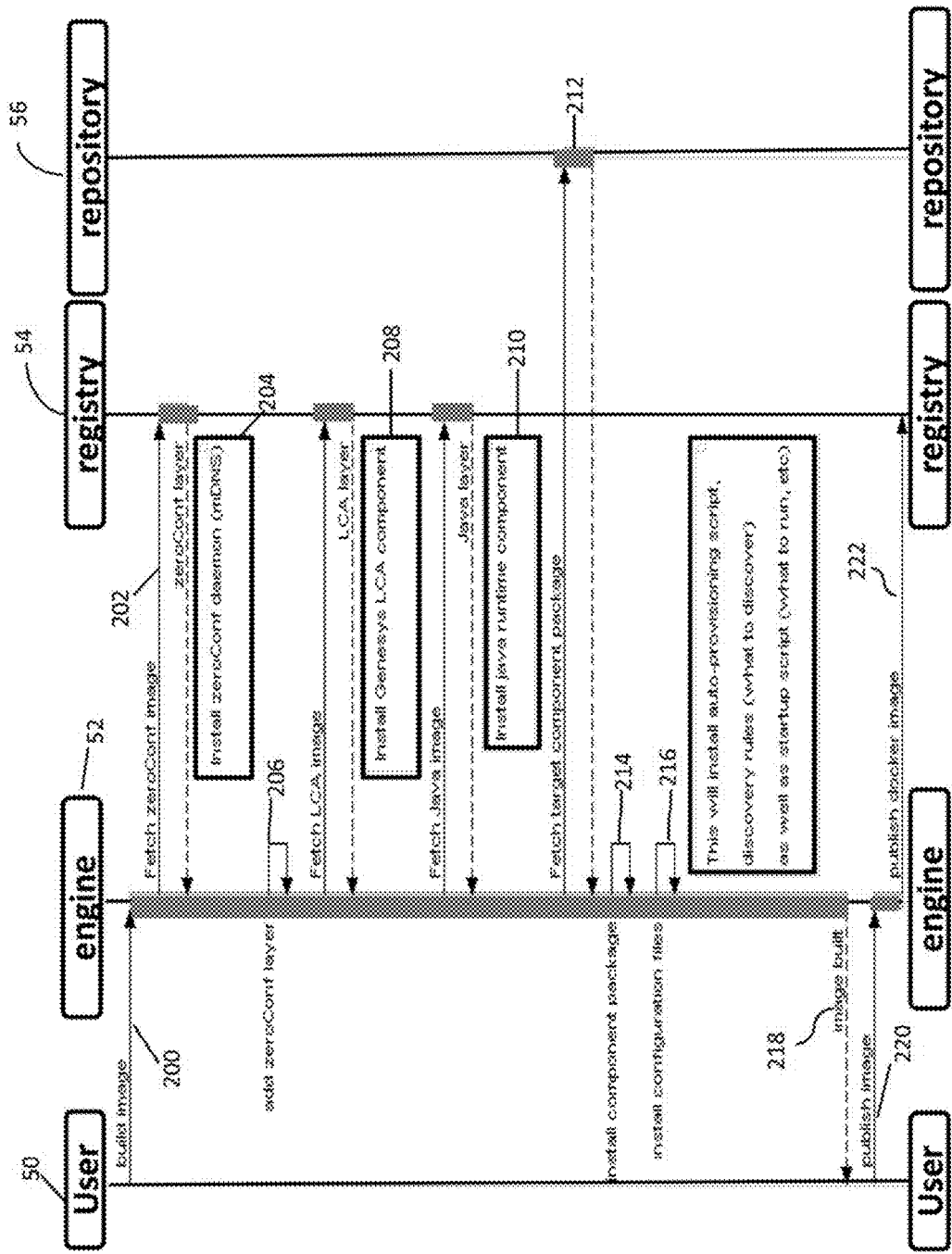
FIG. 4 is a message flow diagram of messages that are exchanged for building self-deploying, self-adapting components according to one embodiment of the invention.

FIG. 4 is a message flow diagram of messages that are exchanged for building self-deploying, self-adapting components according to one embodiment of the invention. In act 200, the end user device 50 transmits a command to the build engine 52 to build an image/container for deploying a particular type of contact center component. According to one embodiment, the command identifies at least the type of component that is to be deployed.

In acts 202-210, the build engine 52 interfaces with the registry 54 for fetching and aggregating the configuration layer 102, monitoring layer 104, and synchronization layer 106, into the container 100. According to one embodiment, the various layers/containers are already generated and stored in the registry 54 for use in building different types of self-deploying, self-adapting components.

In act 212, the build engine 52 fetches a target component package from the repository 56, such as, for example, application 108, and installs the package into the container 100 in act 214.

In act 216, the build engine further installs configuration files that are appropriate for the type of component that is to be deployed. According to one embodiment, the configuration files include auto-provisioning and startup scripts that form part of the auto-deployment logic. Such scripts may describe, for example, specifics of the component, where it should be installed, information on the dependencies including rules on what services to discover, and/or other custom rules for configuring and starting the component.

In act 218, the built image/container is transmitted to the end user device 50 over, for example, the data communications network 56. In addition, the container may itself be published in act 220 by the end user device, and stored in the registry 54 in act 222 for use in building other containers.

According to one embodiment once the container for a particular type of contact center component is built, it may be deployed in any desired environment. In this regard, the component may be ported to different environments without having to be rebuilt based on specifics of the particular environment in which it is to be deployed. For example, the component may be deployed on a cloud computing environment provided by Amazon, and also deployed on other cloud computing environments such as Windows Azure or Heroku, although these environments have different requirements than Amazon's.

The container that is deployed on a particular environment is only provisioned once at startup. The provisioning is based on service discovery via the built-in provisioning logic within container, including for example, the publisher 106a and resolver 106b logics. The provisioning logic ensures that all conditions are met to start the application.

Figure 5:
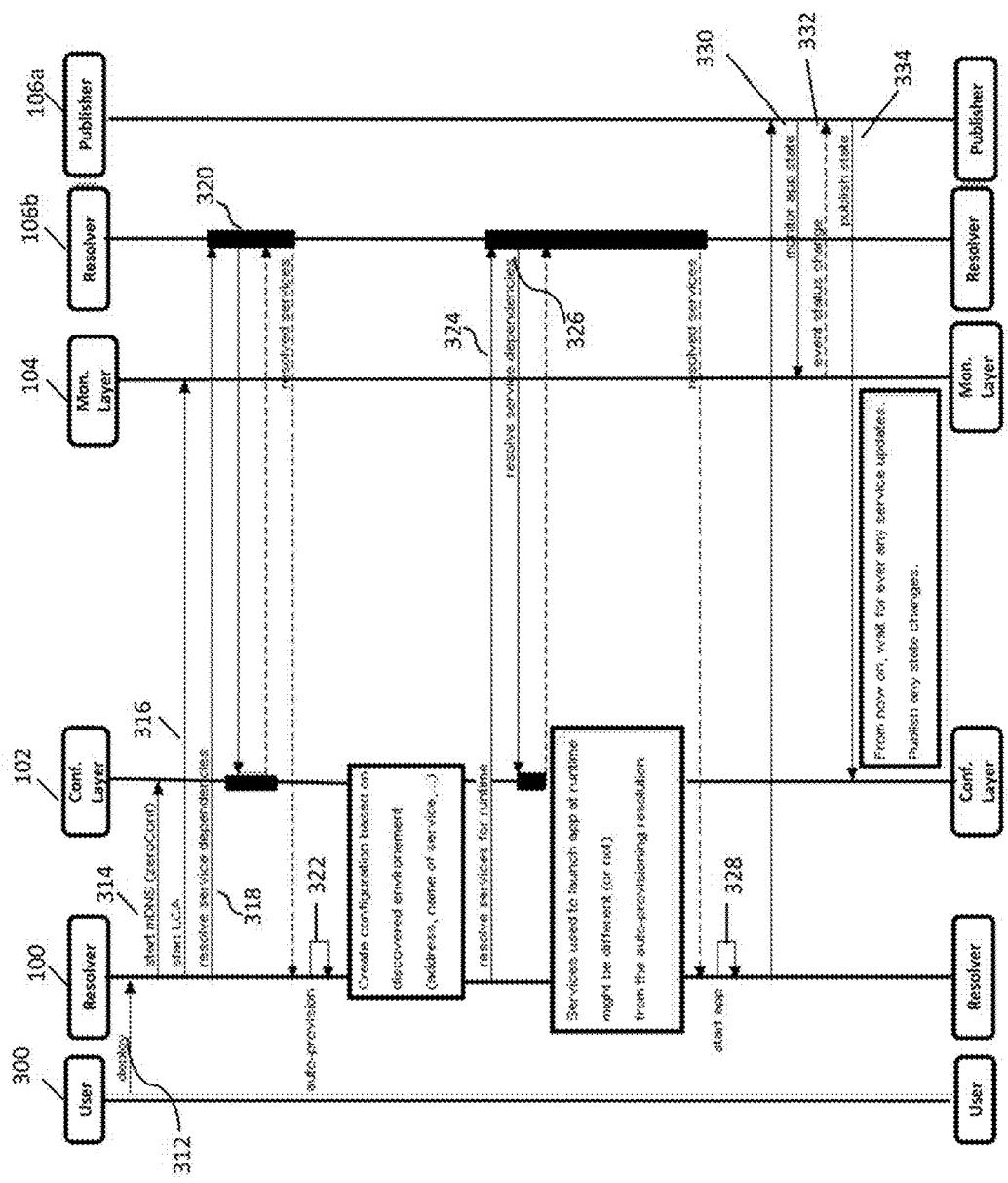
FIG. 5 is a message flow diagram of messages that are exchanged during self-deployment of a contact center application according to one embodiment of the invention.

FIG. 5 is a message flow diagram of messages that are exchanged during self-deployment of a contact center application according to one embodiment of the invention. In act 312, an end user device 300 transmits a command to the container 100 to deploy, and the container starts in response to the command. The person transmitting the command need not understand topology of the network in which the component is to be deployed, or knowledge of files that need to be run or parameters that need to be set, in order to provision and launch the application 108. The user simply transmits a command to deploy, and deployment occurs automatically without relying on any external configuration infrastructure.

In response to receiving the command to deploy, the auto-deployment logic in the container invokes the configuration layer 102 in act 314 to automatically configure the application 108. In this regard, the configuration layer assigns to the application a name to be used on the network. According to one embodiment, the assignment occurs via internal logic without invoking an external directory service. When a naming conflict occurs, the conflict is also resolved internally, for example, by appending an index number to the name with a dash. According to one embodiment, the configuration logic ensures that the index is unique and consecutive on a given network. In addition, the configuration logic automatically allocates and assigns an IP address (v4 or v6) to the application 108. Any conflict in the network address is also resolved automatically by the configuration layer with no external intervention.

In act 316, the auto-deployment logic starts the monitoring layer 104 to start monitoring the various states of the application 108.

In act 318, the auto-deployment logic transmits a command to the resolver 106b to resolve service dependencies. In this regard, the resolver 106b identifies the services and resources needed to deploy the application, along with properties and conditions for the services and resources, and waits for confirmation that the services are available and that conditions for those services have been met, before the dependencies are deemed to be resolved. An example service dependency when configuring an email application may be identifying the network address of the email service provider, and the network address of a database in which to store mail. According to one embodiment, the information associated with the dependencies is neither hardcoded into the auto-deployment logic nor manually set by an administrator. Instead, the information of services and other resources needed to deploy the application are automatically discovered during the deployment. Thus, the self-deployable application according to an embodiment of the invention may be deemed to synchronize and adapt to the environment in which it is deployed.

When all service dependencies are resolved, the auto-deployment logic proceeds to auto-provision the application 108 in act 322. This may entail, for example, generating configuration data about the application based on the discovered environment, such as, for example, name and address of the application, the machine in which it is located, the port to use, and the like. The configuration data is then stored in a configuration server on the network.

According to one embodiment, service dependencies are resolved a second time for runtime dependencies in act 324. In another embodiment, service dependencies are resolved in a single step instead of being resolved in two steps. A runtime dependency may be one that is not needed for configuring the application, but used to launch the application at runtime. An example runtime dependency is information as to whether a particular server to which the application needs to connect to is a primary or backup server.

Once the application has been provisioned, the application starts in act 328, and the auto-deployment logic invokes the publisher 106a for publishing availability of the service provided by the application. In this regard, the publisher 106a invokes the monitoring layer for information on a current state of the application. In acts 330-334, the monitoring layer 104 monitors the application state, and reports the state to the publisher 106a to publish the state via the configuration layer 102. According to one embodiment, the publisher publishes additional data (metadata) about the application, including identification of the machine hosting the application, location of the machine on the network, and/or any other metadata about the service provided by the application (e.g. whether payment is required for the service, whether the service use encrypted data, whether the service is a primary or backup component, and/or the like). Thus, other applications deployed on the computing environment that identify the particular application 108 as its own dependency, may dynamically discover information about the application 108 (e.g. location on the network) without the information being hard coded into the container.

Figure 6:
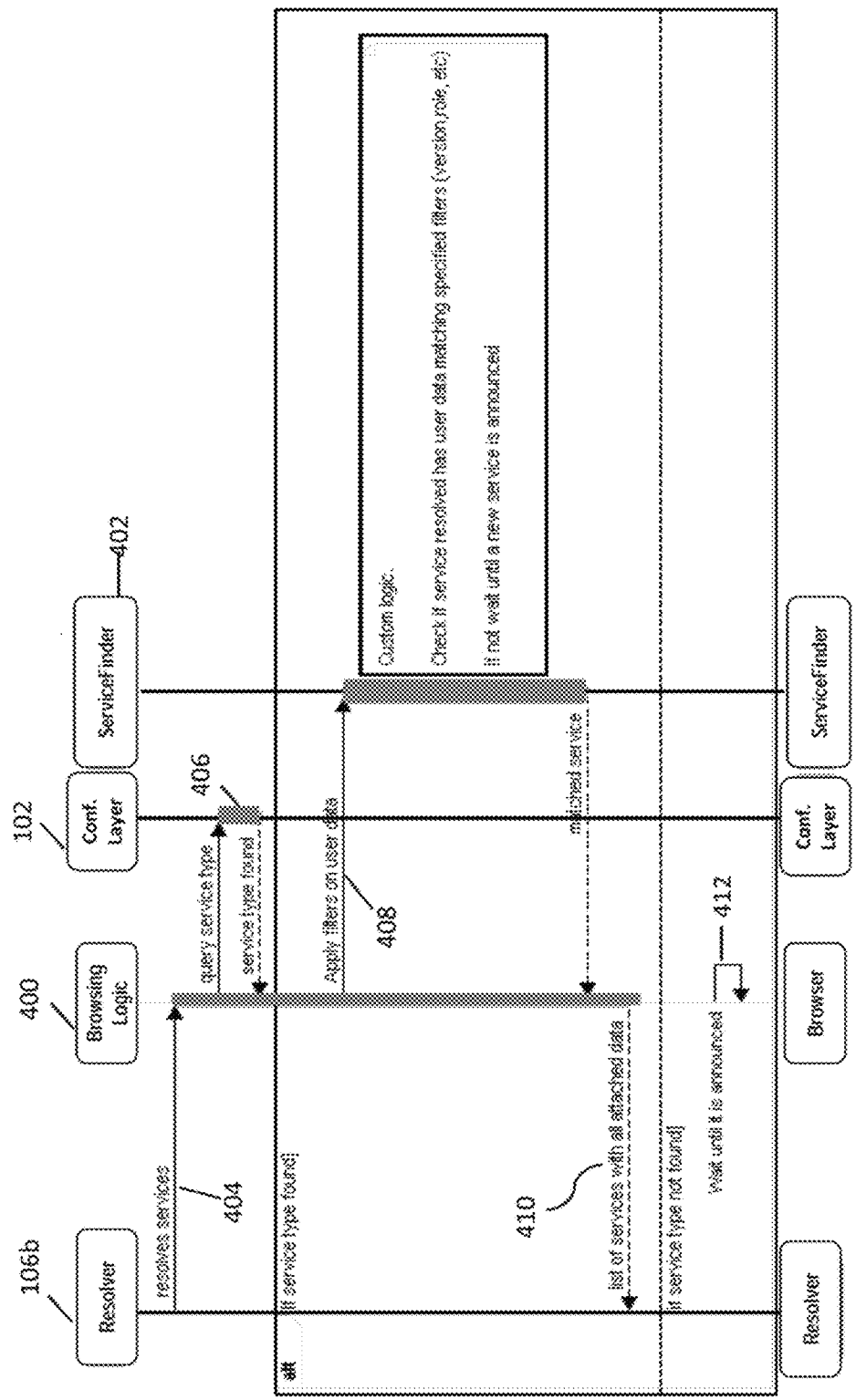
FIG. 6 is a more detailed message flow diagram of messages that are exchanged when resolving service dependencies according to one embodiment of the invention.

FIG. 6 is a more detailed message flow diagram of messages that are exchanged when resolving service dependencies in act 326 of FIG. 5, according to one embodiment of the invention. The resolving of dependencies is also referred to herein, as synchronizing services.

In act 404, the resolver sends a command to resolve services. According to one embodiment, the command is received by browsing logic 400 that is also encapsulated within the container 100 as part of the auto-provisioning logic. The browsing logic may allow automatic detection of devices and services offered by these devices on a computer network.

In act 406, the browsing logic 400 receives the command and queries the configuration layer 102 for each service type that is listed in the service dependencies for the component. According to one embodiment, the query includes the service type, protocol type, and domain type. For example, to discover a web site on the network, the search may be described as "_http._tcp local," indicating that the search is to look for a service type "http" based on "tcp" for domain type "local."

The configuration layer 102 responds with an indication as to whether the service type is found on the network. In this regard, the configuration layer employs a mechanism such as one described in the zeroConf. specification (www-.zeroconf.orq), the content of which is incorporated herein by reference. In general terms, the configuration layer 102 sends a message on the network through, for example, multicast. The configuration layers associated with other applications deployed on the network receive the multicast message, compare the properties of the requested service against the properties of the corresponding application, and respond if it matches the request. According to one embodiment, the response includes the hostname, port number, and any data attached to the service when the service is published via is publication module. In response to a queried service type being found, the browser logic 400 invokes a service finder logic 402, in act 408, to apply custom filters or conditions set in the container to determine whether the service type has data (e.g. metadata) matching the customer filters. Exemplary custom filters that may be set include the service type's version, role, and the like. More specifically, customer filters according to one embodiment include:

version: published version of service (e.g. version number);
role: a string to identify the service role which may be component dependent; exemplary roles include "framework" "configuration", etc.
state: service state (primary/backup/node/seed/etc.).
realm: defines a particular realm. Similar to Call Center Id
cluster: cluster name to which the component belongs
subver-<name>: specify a subversion of component
optional: specify if service is required or optional; resolver will block if service is required
instances=<number>: a minimum number of distinct instances of the service searched.

If the service type has data that matches the custom filters, the service is returned, in act 410, to the resolver 106b with the attached data. The particular service type is then deemed to be resolved.

If, however, any one of the required service types that are listed in the service dependencies for the component is not resolved, as determined in act 410, the resolver continues to wait for the dependency to be resolved. Thus, according to one embodiment, the resolver 106b blocks the provisioning of the component 108, or refrains from provisioning the component, until all required service dependencies have been resolved.

Figure 7:
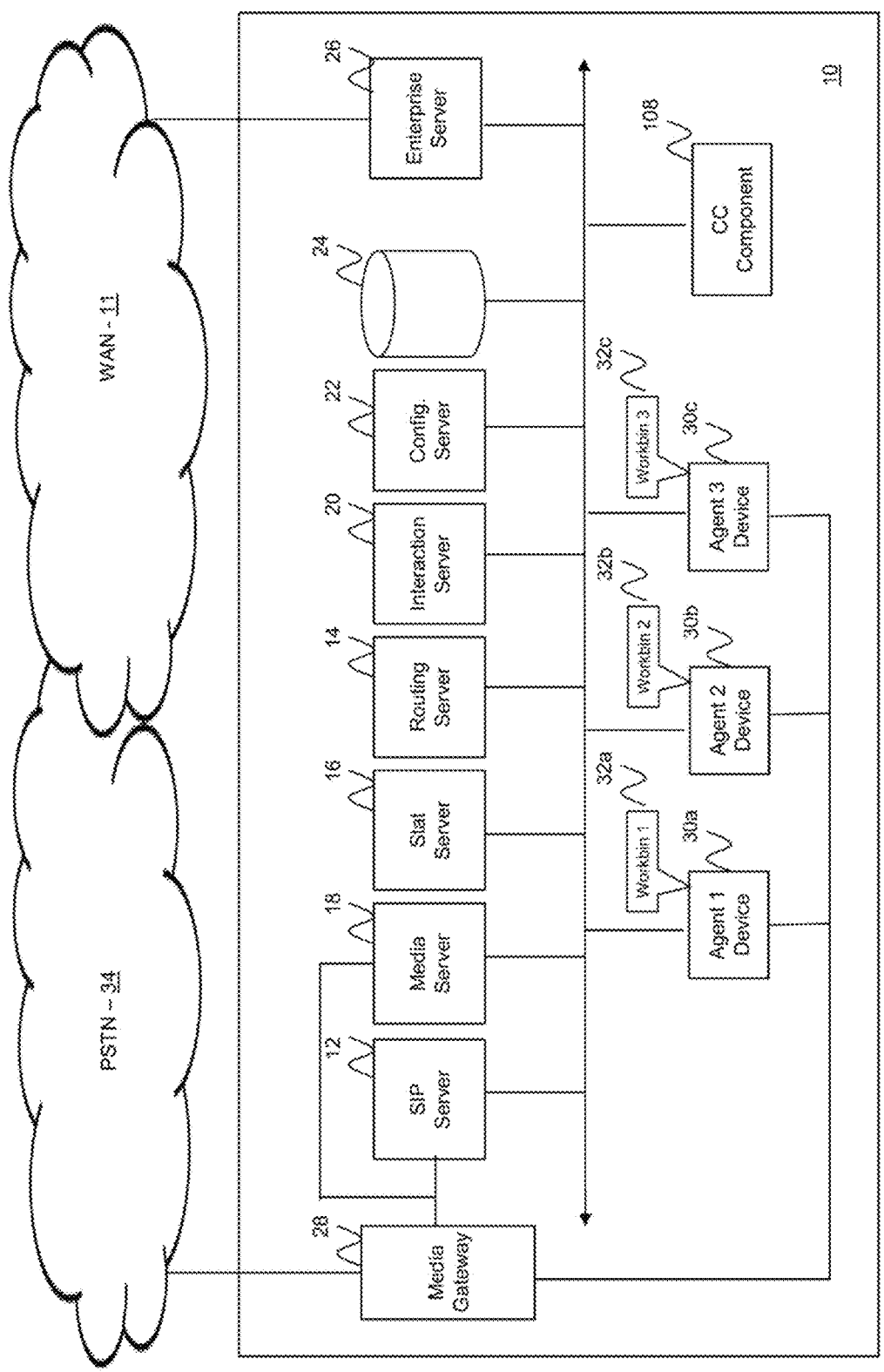
FIG. 7 is a more detailed schematic block diagram of a contact center system where a contact center component may be deployed according to one embodiment of the invention.

FIG. 7 is a more detailed schematic block diagram of a contact center system 10 where a contact center component, such as component 108, may be deployed according to one embodiment of the invention. The system includes various contact center servers including, for example, a SIP server 12, routing server 14, statistics server 16, media server 18, interaction server 20, configuration server 22, and the like. According to one embodiment, the servers 12-22 are implemented as software components that may also be self-deployed in the contact center environment according to the mechanism described with respect to FIGS. 4-6. Although the various servers are described as separate functional units, a person of skill in the art will recognize that the functionality of the various servers may be combined or integrated into a single server, or further subdivided into other separate functional units without departing from the spirit of the invention.

According to one embodiment, the system also hosts a mass storage device 24 which may take form of a hard disk or disk array as is conventional in the art. According to one exemplary embodiment of the invention, the mass storage device 24 stores one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and/or the like. According to one embodiment, some of the data (e.g. customer profile data) may be provided by a third party database such as, for example, a third party customer relations management (CRM) database. The third party database may be provided, for example, by an external service. The third party database may also be incorporated into the contact center core functions as an enhancement to those core functions.

According to one embodiment, customers, potential customers, or other end users (collectively referred to as customers) desiring to receive services from the contact center may initiate inbound contact to the contact center via their end user devices (not shown). Each of the end user devices may be a communication device conventional in the art, such as, for example, a telephone, wireless phone, smart phone, personal computer, electronic tablet, and/or the like. Users operating the end user devices may initiate, manage, and respond to telephone calls, emails, chats, text messaging, web-browsing sessions, and other multi-media interactions.

Inbound and outbound interactions from and to the end users devices may traverse a telephone, cellular, and/or data communication network depending on the type of device that is being used and the type of media channel that is invoked. For example, the communications network may include a private or public switched telephone network (PSTN) 34, the wide area network 11, and/or the like. The communications network may also include a wireless carrier network including a code division multiple access (CDMA) network, global system for mobile communications (GSM) network, and/or any 3G or 4G network conventional in the art.

According to one exemplary embodiment, the contact center includes a media gateway 28 coupled to the PSTN network 34 for receiving and transmitting telephony calls between end users and the contact center. The media gateway 28 may take the form of an automatic call distributor, a private branch exchange (PBX), an IP-based software switch, and/or any other switch or gateway configured to receive Internet-sourced calls and/or telephone network-sourced calls. According to one exemplary embodiment of the invention, the media gateway 28 is coupled to a SIP (Session Initiation Protocol) server 12 which may, for example, serve as an adapter or interface between the media gateway and the remainder of the routing, monitoring, and other call-handling components of the contact center. Although SIP is used as an example protocol to which the server 12 adheres, a person of skill in the art will understand that any other protocol other than SIP may be used for processing telephony calls between customers and the contact center.

According to one embodiment, interactions other than telephony interactions are received by an enterprise server 26 and forwarded to the interaction server 20 for further handling. The other types of interactions may include, for example, email, vmail (voice mail through email), chat, video, text-messaging, web, social media, co-browsing, web real time communication (WebRTC), and the like. In this regard, the enterprise server 26 may take the form of an email server, web server, and/or the like. According to one embodiment video and WebRTC calls are handled by the SIP server 12 instead of the interaction server 20. Also, according to one embodiment, a central interaction server 20 handles the various non-telephony interactions for the contact center. Multiple interactions servers may also be deployed in other embodiments. The multiple interaction servers may allow handling of various non-telephony interactions concurrently. The multiple interactions servers may also serve as backup servers that are passive during normal operation, but become active when the central interaction server is down. The same may apply for other components of the CC node, such as, for example, the routing server 14.

The routing server 14 may be configured to work with the SIP server 12 and/or interaction server 20 for routing interactions to a contact center target based on a routing strategy associated with a particular route point (e.g. a called number). Depending on the type of routing strategy configured for the route point, different options, voice treatments, and routing is performed for the interaction.

The media server 18 may be configured to identify parameters (e.g. available media ports on the media server) for establishing voice conversations between a customer and a contact center target. The media server 18 is also configured to deliver media to customers and/or agents. For example, the media server 18 may be invoked to provide initial greeting messages to a calling customer, and interactive voice response (IVR) treatment to obtain basic customer information (e.g. identification information, reason for the call, etc.). If the customer or agent is placed on hold, the media server 18 may be invoked to play music for the holding customer or agent. In another example, if a conversation between the customer and agent is to be recorded, the call may traverse the media server so that the customer and agent may engage in a three way conversation with the media server, and the media server may record the conversation and store the recorded conversation in a database.

The statistics server 16 may be configured to gather, store, analyze, and/or deliver data regarding various resources of the contact center. Such data may include data regarding agent availability, average handling time, average hold time, total talk time, after work time, average speed of answer, service level statistics, abandonment rate, patience rate, and the like. The delivery of statistics data may be to subscribing clients, such as, for example, delivery of agent status to the routing server 14, and real-time statistics to reporting applications.

The configuration server 22 may include logic for configuring the various servers and other aspects of contact center functionality as will be appreciated by a person of skill in the art. According to one embodiment, the component 108 that is self-deployed in the contact center environment registers itself with the configuration server 22 as described above with respect to FIG. 5.

According to one embodiment, a telephony call is received by the media gateway 28 and the SIP server 12 is invoked for further handling. The SIP server 12 invokes the routing server 14 (e.g. by sending an event message) for retrieving a routing strategy for routing the call to an appropriate target. If the call is to be routed to a contact center agent, the routing server 14 identifies an appropriate agent for routing the call. The selection of an appropriate agent may be based, for example, on a routing strategy employed by the routing server 14, and further based on information about agent availability, skills, and other routing parameters provided, for example, by the statistics server 16.

The routing server 14 signals the SIP server 12 with information on the agent to which the call is to be routed. In this regard, the SIP server 12 transmits one or more SIP messages to establish a connection between the customer end device and an agent device 30a-30c (collectively referenced as 30). Collected information in the mass storage device 24 about the caller and/or the caller's historical information may also be provided to the agent device for aiding the agent in better servicing the call. In this regard, each agent device 30 may include a telephone adapted for regular telephone calls, VoIP calls, and the like. The agent device 30 may also include a computer for communicating with one or more servers of the contact center and performing data processing associated with contact center operations, and for interfacing with customers via voice and other multimedia communication mechanisms.

According to one embodiment, if there are no available agents to handle the call, the media server 18 may be invoked for playing different types of media (e.g. music) while the call is put on hold. The media server 18 may also be configured to provide messages indicative of how long the customer has to wait before an agent becomes available to handle the call.

According to one exemplary embodiment of the invention, the routing server 14 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity may be pushed to the agent, or may appear in the agent's workbin 32a-32c (collectively referenced as 32) as a task to be completed by the agent. The agent's workbin may be implemented via any data structure conventional in the art, such as, for example, a linked list, array, and/or the like. The workbin may be maintained, for example, in buffer memory of each agent device 30.

As a person of skill in the art should appreciate, embodiments of the present invention may be used to create immutable contact center infrastructures efficiently and dynamically based upon need, with no prior configuration. Need may be detected by monitoring usage of contact center resources including CPU and/or memory consumption. Based on the detected need, resources may be scaled up or scaled down on the fly. For example, if a spike in call volume occurs, SIP server resources could be increased by launching new SIP containers. When the call volume goes down, the added SIP containers could then be removed. Containers of additional database systems may also be added to increase storage capacity to the contact center.

New capabilities could also be added to a contact center by adding new types of containers. For example, a statistics server application similar to the statistics server 16 (FIG. 7) may be added to an agent's desktop. In addition, a chat server application may be added to add chat capabilities to the contact center, or an email server application may be added to add email capabilities.

Also, embodiments of the present invention may also be used to create test environments for automation, create test containers to run tests against a given environment, or the like. For example, a test container may be deployed to test the export/upload of files from one platform to another. For example, an immutable testing environment may be created to test the export/upload of files from one database system to another.

In one embodiment, each of, the various servers, controllers, switches, gateways, engines, and/or modules (collectively referred to as servers) in the afore-described figures are implemented via hardware or firmware (e.g. ASIC) as will be appreciated by a person of skill in the art.

In one embodiment, each of the various servers, controllers, engines, and/or modules (collectively referred to as servers) in the afore-described figures may be a process or thread, running on one or more processors, in one or more computing devices 1500 (e.g., FIG. 8A, FIG. 8B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 8A:
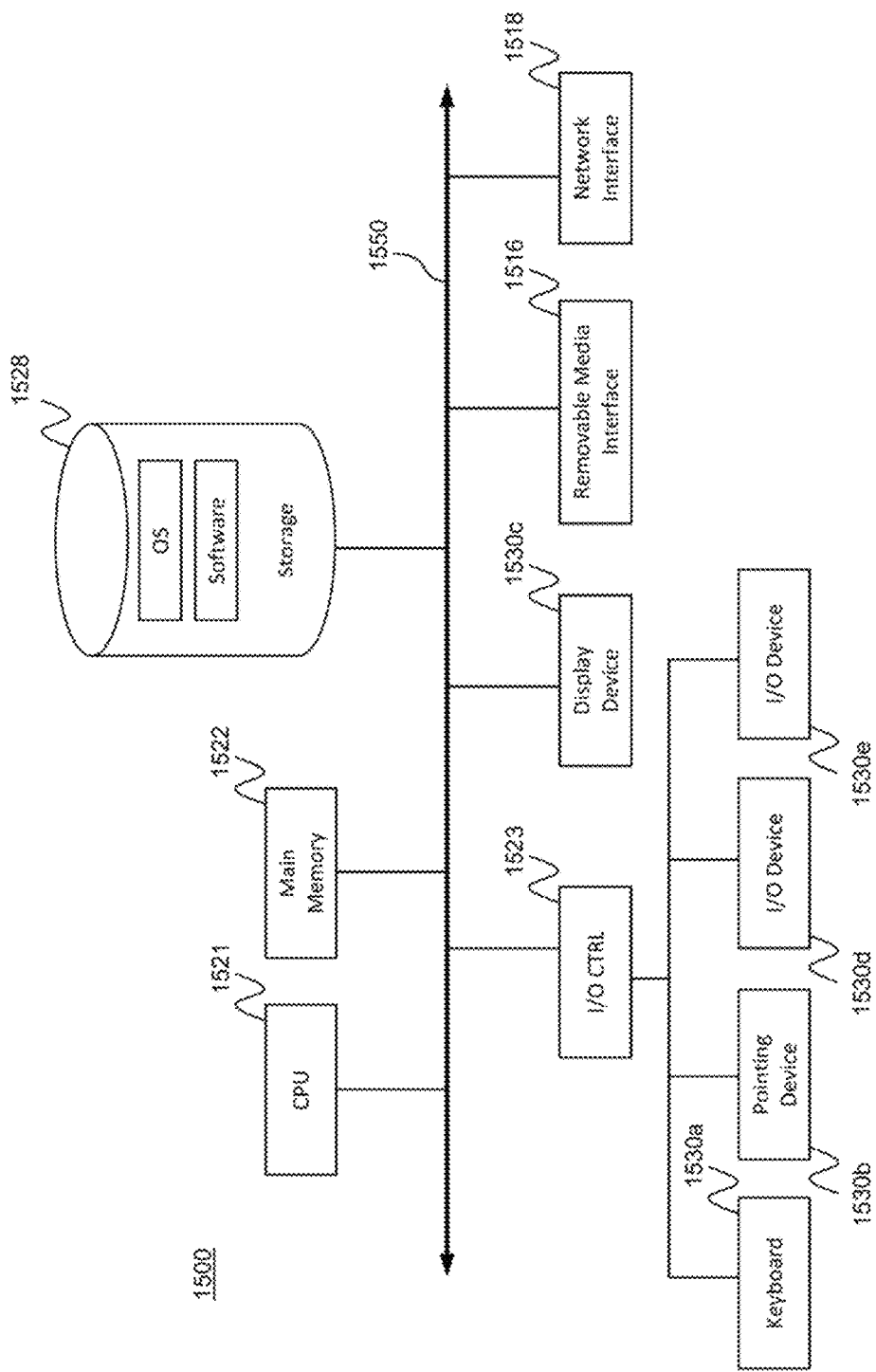
FIG. 8A is a block diagram of a computing device according to an embodiment of the present invention.
Figure 8B:
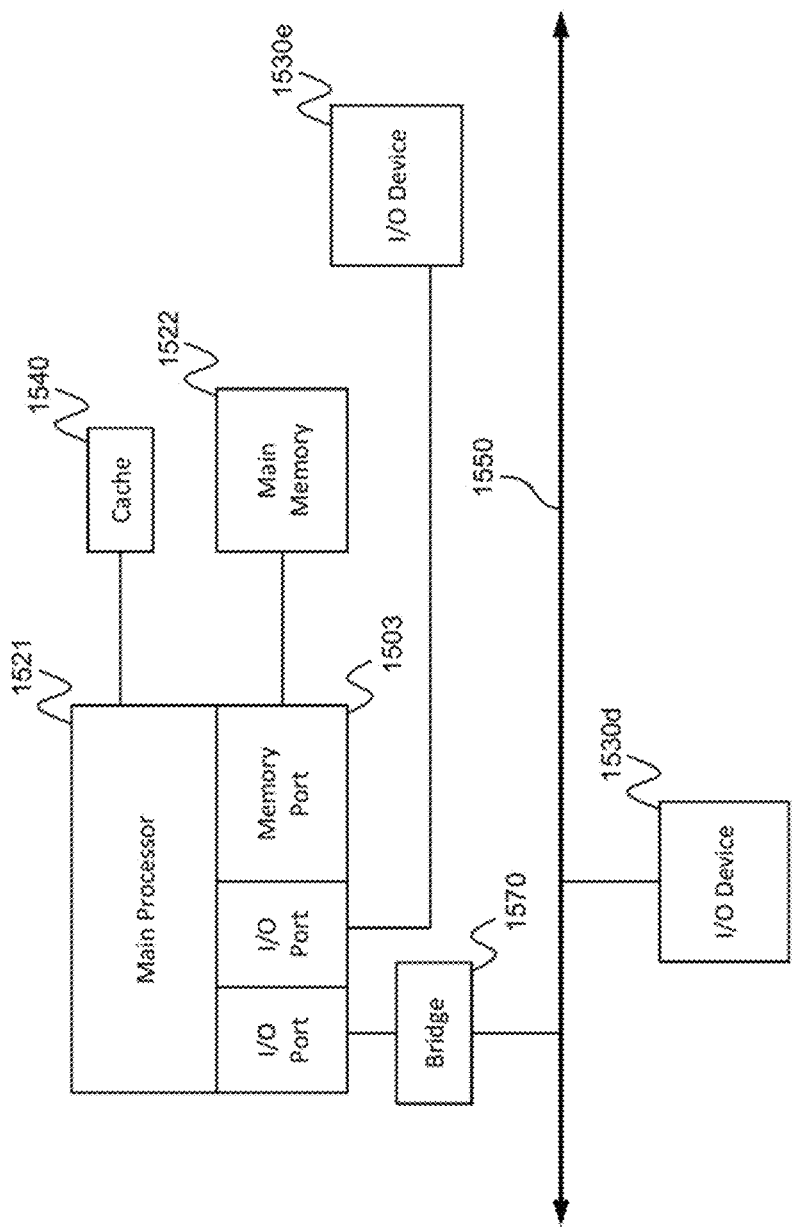
FIG. 8B is a block diagram of a computing device according to an embodiment of the present invention.

FIG. 8A and FIG. 8B depict block diagrams of a computing device 1500 as may be employed in exemplary embodiments of the present invention. Each computing device 1500 includes a central processing unit 1521 and a main memory unit 1522. As shown in FIG. 8A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 8B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 8A, the central processing unit 1521 communicates with the main memory 1522 via a system bus 1550. As shown in FIG. 8B, the central processing unit 1521 may also communicate directly with the main memory 1522 via a memory port 1503.

FIG. 8B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 8A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 8B depicts an embodiment of a computer 1500 in which the central processing unit 1521 communicates directly with. I/O device 1530e. FIG. 8B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 8A, may control the I/O devices. The I/O controller may control one or more I/O devices such as a keyboard 1530a and a pointing device 1530b, e.g., a mouse or optical pen.

Referring again to FIG. 8A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways, and embodiments that a computing device 1500 may be configured to have multiple display devices 1530c.

A computing device 1500 of the sort depicted in FIG. 8A and FIG. 8B may operate under the control of an operating system, which controls scheduling of tasks and access to system resources. The computing device 1500 may be running any operating system, any embedded operating, system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 8C:
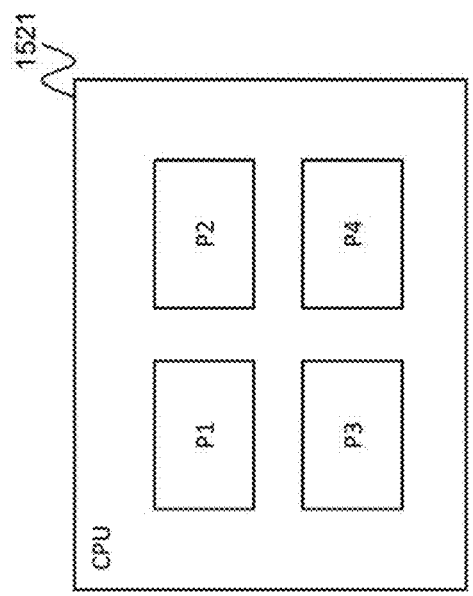
FIG. 8C is a block diagram of a computing device according to an embodiment of the present invention.
Figure 8D:
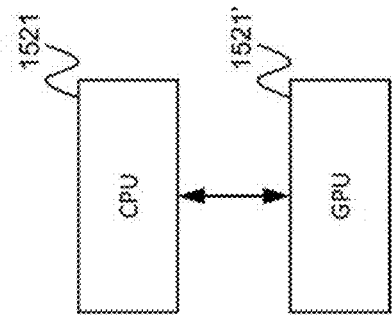
FIG. 8D is a block diagram of a computing device according to an embodiment of the present invention.

As shown in FIG. 8C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 8D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 8E:
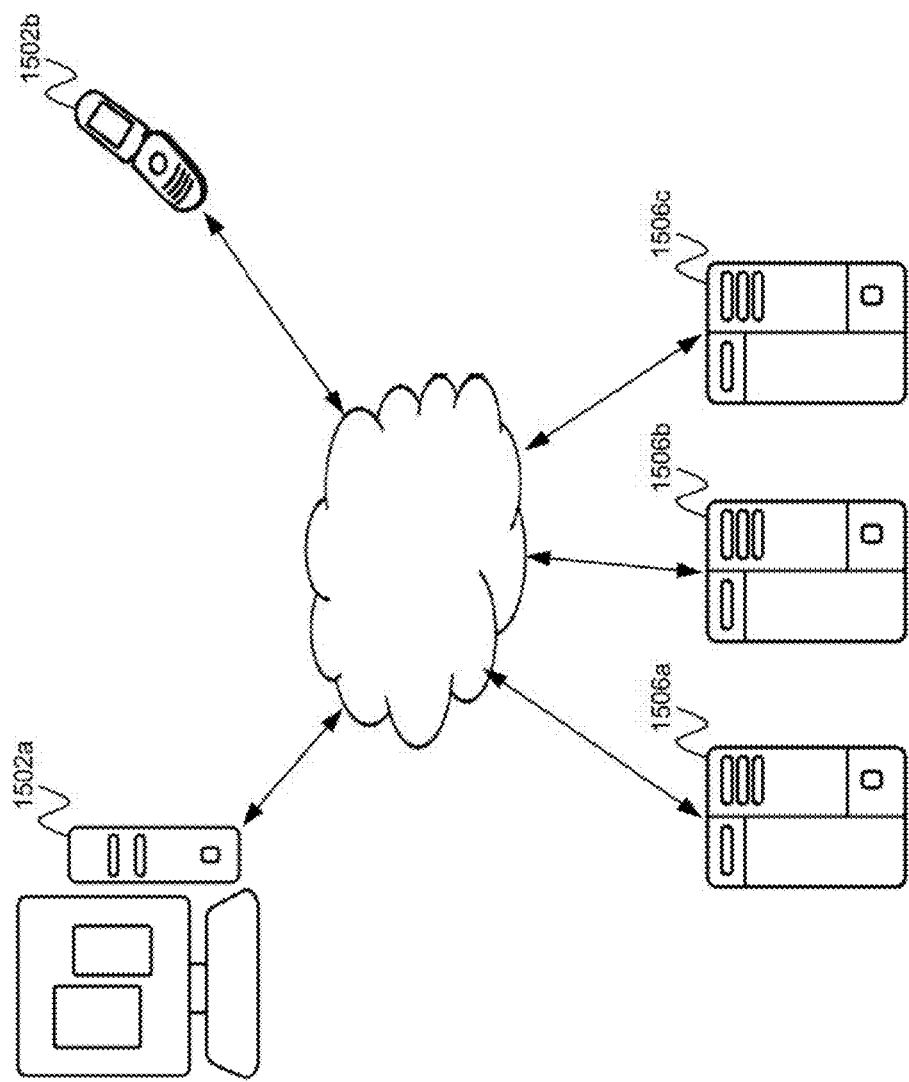
FIG. 8E is a block diagram of a network environment including several computing devices according to an embodiment of the present invention.

A computing device may be one of a plurality of machines connected by a network, or it may comprise a plurality of machines so connected. FIG. 8E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502 or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 8E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 8E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization are also contemplated, such as, for example, the network (e.g. via Software Defined Networking (SDN)). Functions, such as functions of the session border controller and other types of functions, may also be virtualized, such as, for example, via Network Functions Virtualization (NFV).

Although this invention has been described in certain specific embodiments, those skilled in the art will have no difficulty devising variations to the described embodiments which in no way depart from the scope and spirit of the present invention. Furthermore, to those skilled in the various arts, the invention itself herein will suggest solutions to other tasks and adaptations for other applications. Thus, the present embodiments of the invention should be considered in all respects as illustrative and not restrictive.

The invention claimed is:

1. A system for self-deploying applications for a contact center, the system comprising:
   a processor; and
   a memory, wherein the memory stores instructions that, when executed by the processor, cause the processor to:
   receive instructions to build an executable unit for deploying an application for the contact center;
   in response to the instructions, aggregate into the executable unit, the application and logic for provisioning the application; and
   provide the executable unit for self-deploying the application on a computing environment associated with the contact center, wherein the logic is configured to perform actions for self-deploying the application in response to the executable unit being run, wherein the actions configured to be performed by the logic include:
   assigning a network name and a network address to the application;
   identifying a plurality of external services depended upon by the application for deploying the application on the computing environment;
   transmitting a request for the plurality of external services, wherein the request is for being transmitted to a plurality of other applications deployed on the computing environment;
   receiving a response from a particular other application of the plurality of other applications deployed on the computing environment, the response including an address of the particular other application on the network; and
   provisioning the application on the computing environment based on the assigned name and network address of the application, and the address of the particular other application.

2. The system of claim 1, wherein the actions include automatically registering the application on the computing environment.

3. The system of claim 1, wherein the assigning the network name and the network address to the application is without access to an external directory service.

4. The system of claim 3, wherein the assigning the network name and the network address to the application includes resolving naming and address conflicts without access to the external directory service.

5. The system of claim 1, wherein the actions include monitoring a state of the application and publishing the state to other applications on the computing environment.

6. The system of claim 1, wherein the executable unit includes data on the plurality of external services depended upon by the application.

7. The system of claim 1, wherein the identifying of the plurality of the external services includes comparing data of the responding particular other application against service conditions stored in the executable unit, and determining a match of the data against the service conditions.

8. The system of claim 1, wherein the actions performed by the logic include blocking provisioning of the application in response to failure in identifying one of the plurality of other applications as capable of providing one of the plurality of the external services.

9. The system of claim 1, wherein the instructions that cause the processor to aggregate the application and the logic include instructions that cause the processor to generate a container for the application and the logic via container technology.

10. A method for self-deploying applications for a contact center, the method comprising:
   receiving, by a processor, instructions to build an executable unit for deploying an application for the contact center;
   in response to the instructions, aggregating, by the processor, into the executable unit, the application and logic for provisioning the application; and
     providing, by the processor, the executable unit for self-deploying the application on a computing environment associated with the contact center, wherein the logic is configured to perform actions for self-deploying the application in response to the executable unit being run, wherein the actions configured to be performed by the logic include:
       assigning a network name and a network address to the application;
       identifying a plurality of external services depended upon by the application for deploying the application on the computing environment;
       transmitting a request for the plurality of external services, wherein the request is for being transmitted to a plurality of other applications deployed on the computing environment;
       receiving a response from a particular other application of the plurality of other applications deployed on the computing environment, the response including an address of the particular other application on the network; and
       provisioning the application on the computing environment based on the assigned name and network address of the application, and the address of the particular other application.

11. The method of claim 10, wherein the actions include registering the application on the computing environment.

12. The method of claim 11, wherein the assigning the network name and the network address to the application is without access to an external directory service.

13. The method of claim 11, wherein the assigning the network name and the network address to the application includes resolving naming and address conflicts without access to the external directory service.

14. The method of claim 10, wherein the actions include monitoring a state of the application and publishing the state to other applications on the computing environment.

15. The method of claim 10, wherein the executable unit includes data on the plurality of external services depended upon by the application.

16. The method of claim 10, wherein the identifying of the plurality of external services includes comparing data of the responding particular other application against service conditions stored in the executable unit, and determining a match of the data against the service conditions.

17. The method of claim 10, wherein the actions performed by the logic include blocking provisioning of the application in response to failure in identifying one of the plurality of other applications as capable of providing one of the plurality of the external services.

18. The method of claim 10, wherein the aggregating of the application and the logic include generating a container for the application and the logic via container technology.

\* \* \* \* \*